(12) United States Patent
Eriksson et al.

(10) Patent No.: US 6,925,992 B1
(45) Date of Patent: Aug. 9, 2005

(54) METHOD AND DEVICE FOR AN EGR-SYSTEM AND A VALVE AS WELL AS A REGULATION METHOD AND DEVICE

(75) Inventors: Ingemar Eriksson, Kvissleby (SE); Micael Blomquist, Kvissleby (SE)

(73) Assignee: STT Emtec AB, Sundsvall (SE)

( * ) Notice: Subject to any disclaimer, the term of this patent is extended or adjusted under 35 U.S.C. 154(b) by 0 days.

(21) Appl. No.: 09/831,435

(22) PCT Filed: Nov. 9, 1999

(86) PCT No.: PCT/SE99/02029

§ 371 (c)(1),
(2), (4) Date: Aug. 21, 2001

(87) PCT Pub. No.: WO00/28203

PCT Pub. Date: May 18, 2000

(30) Foreign Application Priority Data

Nov. 9, 1998 (SE) .................................. 9803827
Dec. 7, 1998 (SE) .................................. 9804240

(51) Int. Cl.$^7$ ........................................... F02M 25/07
(52) U.S. Cl. .................... 123/568.12; 123/568.19; 60/278; 137/595
(58) Field of Search ................ 251/129.02, 129.11, 251/206, 305; 123/568.11, 568.12, 568.15, 123/568.17, 568.19, 568.23, 568.24; 137/595, 137/607, 862; 60/278

(56) References Cited

U.S. PATENT DOCUMENTS

| | | | | |
|---|---|---|---|---|
| 4,020,809 A | * | 5/1977 | Kern et al. | 123/568.24 |
| 4,924,840 A | * | 5/1990 | Wade | 123/568.19 |
| 5,205,265 A | * | 4/1993 | Kashiyama et al. | 123/568.12 |
| 5,427,141 A | * | 6/1995 | Ohtsubo | 137/595 |
| 5,937,651 A | | 8/1999 | Braun et al. | |

FOREIGN PATENT DOCUMENTS

| | | | | | |
|---|---|---|---|---|---|
| DE | 3237337 A | * | 4/1983 | | F02B 37/00 |
| DE | 4007516 | | 9/1991 | | |
| DE | 19728353 | | 9/1998 | | |
| WO | 98/55759 | | 12/1998 | | |

* cited by examiner

Primary Examiner—Willis R. Wolfe
Assistant Examiner—Arnold Castro
(74) Attorney, Agent, or Firm—Dilworth & Barrese LLP.

(57) ABSTRACT

The invention is related to a method and a device for recirculation of a part of exhaust gases from an exhaust pipe (6, 9) of a diesel engine (1) to the inlet of the engine, the exhaust gases being diverted from the exhaust pipe (6, 9) and directed through a recirculation conduit (10) to a controllable valve device (12) arranged between the engine and the air intake (2) thereof for allowing supply of air/recirculated exhaust gases in a desired relation to the combustion chamber of the engine (1). The invention also relates to a particular valve having two controllable inlets, said valve being useful in the method or device according to the invention, and a regulation method and device for regulating the air/fuel relation of a diesel engine.

18 Claims, 2 Drawing Sheets

METHOD AND DEVICE FOR AN EGR-SYSTEM AND A VALVE AS WELL AS A REGULATION METHOD AND DEVICE

The present invention is related to a method and a device for an EGR-system (Exhaust Gas Recirculation), particularly for use in heavy-duty diesel engines. The invention also relates to a valve which is particularly suited for the method and device according to the invention but the valve may also find use within other fields. Finally, the invention is also related to a regulation method and device for a diesel engine.

In order to reduce the contents of hazardous exhaust gases, particularly nitrogen oxide. (NOx), so called EGR-systems are used since many years in many types of combustion engines. Such systems admit a part of the exhaust gases to be recirculated to the intake system of the engine, where it is mixed with the intake air and is conveyed further to the combustion chamber of the engine. The recirculated exhaust gases replace a part of the intake air and have a reducing effect on the formation of NOx. A so called EGR-valve is then placed in connection with the exhaust system of the engine, the purpose of said valve being to regulate the amount of recirculated exhaust gases.

A method and a device according to the precharacterising parts of enclosed claims 1 and 6 are disclosed in DE A1 4 007 516. Although this prior art makes it possible to use an EGR-system in super charged diesel engines, where the pressure in the intake system downstream of the super charger is higher than the pressure in a recirculation conduit from an EGR-valve some important disadvantages are inherent in this prior art. Thus, the valve device comprises separate dampers arranged in the EGR-recirculation channel and an air intake channel. Separate drive motors are provided for these dampers, a fact which makes the valve device complicated and this also applies for a control device therefor.

OBJECT OF THE INVENTION

A primary object of the present invention is to provide a method enabling a more reliable and simple regulation of the relation air/recirculated exhaust gases. As to the device according to the invention, the aim is to simplify the valve device and provide for a more reliable and simple control thereof.

A secondary object of the invention is to provide a valve suitable for mixing two fluids flowing through two inlet channels. Such a valve should be suitable for general purposes but is particularly useful in an EGR-system for diesel engines, including super charged diesel engines.

A tertiary object of the invention is to provide a regulation method and device providing for improved regulation possibilities with regard to a diesel engine provided with an EGR-system.

SUMMARY OF THE INVENTION

The primary object of the invention is achieved by the features defined herein. The design of the valve device as comprising two dampers, where at least one of the dampers always is open and where the other of the dampers is closable by means of a drive motor common to the dampers provides for a simple design and a reliable operation.

The secondary object of the invention is achieved by means of the valve as defined herein.

The tertiary object of the invention is achieved by means of the regulation method and device as defined herein. Thus, this aspect of the invention is based on use of probes and sensors connected to a control device for the valve device so as to enable regulation not only of the relation air/recirculated exhaust gases but also regulation of the air/fuel relation of the engine.

This aspect of the invention provides for an improved overall regulation of the engine and a smaller amount of pollution.

Preferable developments of the basic aspects of the invention are defined herein.

The use of an EGR-system as contemplated by the invention on an engine provided with a catalyst and a particle filter according to the prior art results in a substantial reduction of the NOx contents. This reduction may be up to 50% and makes it possible to upgrade existing diesel engines to present emission requirements and to upgrade modern diesel engines to future emission requirements.

BRIEF DESCRIPTION OF THE DRAWINGS

The invention will now be described by means of non-limiting embodiments illustrated in the drawings, where.

DETAILED DESCRIPTION OF PREFERRED EMBODIMENTS

Figure 1:
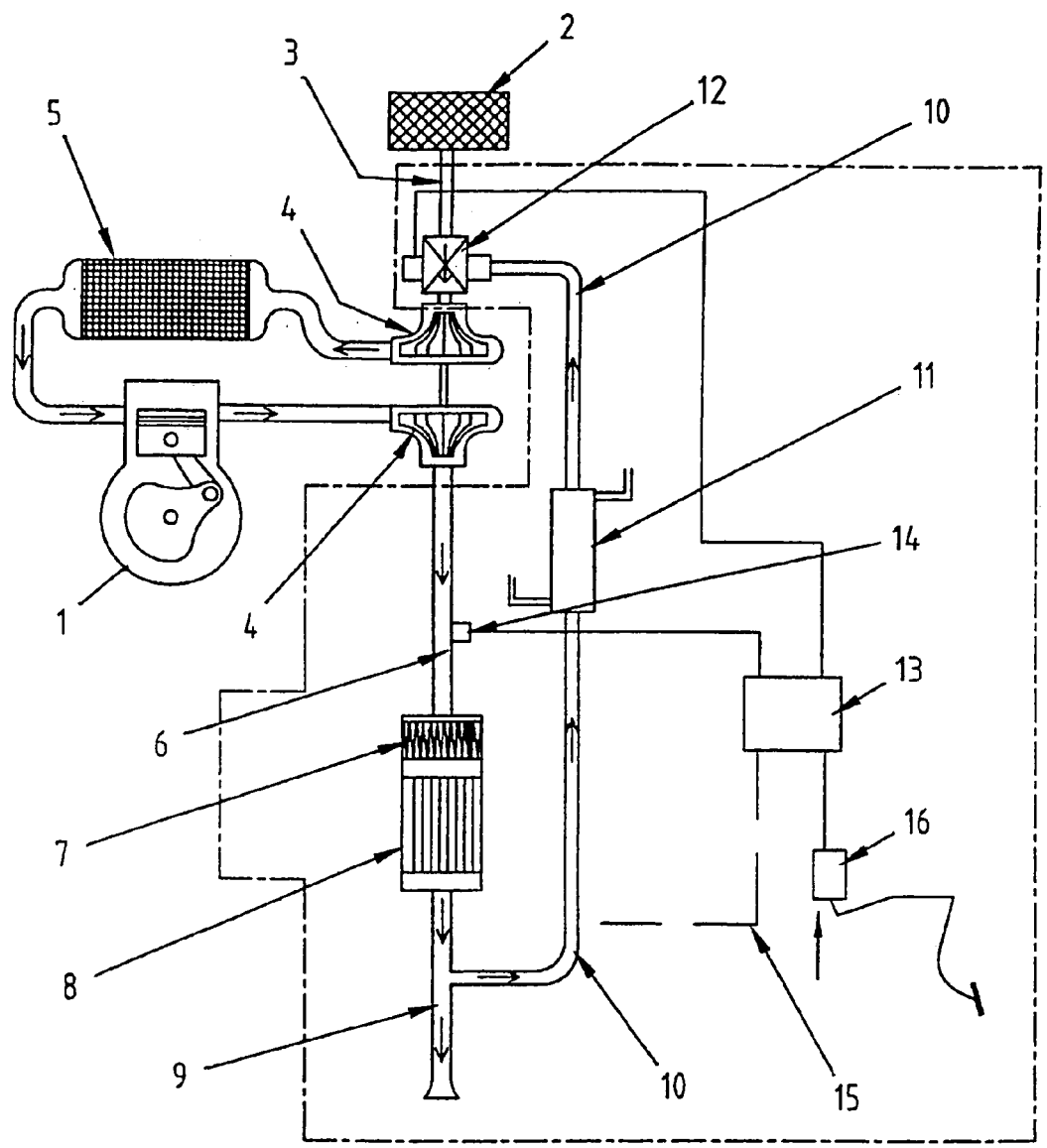
FIG. 1 illustrates a diagrammatical view of an EGR-system according to the invention.

FIG. 1 is a diagrammatical view showing the parts, which are essential to the invention, of a combustion engine indicated with the reference character 1. The engine is in the selected embodiment example a turbo charged diesel engine but as already mentioned the engine may be a diesel engine without super charging or a diesel engine with a different type of super charging than a turbo charger. Air is taken to the engine 1 through an air intake, an air filter 2, and is directed via an inlet air channel 3 to a turbo charger 4, where the air is super charged and then conveyed further through an intercooler 5, where the super charged air is cooled down before it is conveyed into the engine 1. The exhaust gases from the engine 1 are first directed through the second side of the turbo charger 4, namely that side which is the driving one, and then through an exhaust pipe 6, a catalyst 7 and a particle trap 8 to finally be emitted to the open air via an end pipe 9.

From the end pipe 9, i.e. an extension of the exhaust pipe after the catalyst and particle trap, there is a branch, a recirculation conduit 10, to recirculate from the exhaust gases a part thereof to the engine. The recirculation conduit 10 passes suitably through a cooler 11 to cool down the recirculated exhaust gases and it connects to the inlet air channel 3 via a valve device 12 controllable by means of an EGR control device 13. The valve device 12 may, with the assistance of the EGR control device 13, regulate the relation between the supplied amount of fresh air from the inlet air channel 3 and the supplied amount of recirculated exhaust gases from the recirculation conduit 10.

The EGR control device 13 regulating the valve device 12 is supplied with information about the actual operational state of the engine from a.o. a Lambda probe 14, a sensor 15 for the number of revolutions of the engine and a sensor 16 for engine load and this control device is programmed to control the valve device 12 and, accordingly, the mixing relation fresh air/exhaust gases for the purpose of minimising the contents of hazardous substances leaving the end pipe 9 and being emitted into the open air. The programming of the EGR control device 13 occurs in a previously known manner with regard to the relations between the different factors given hereinabove. As is well known, a Lambda probe provides an output signal varying with the oxygen contents of the exhaust gases. The engine load sensor 16 may for instance be a throttle position sensor and/or a sensor sensing the amount of fuel injected to the engine. Also other sensors than those mentioned may be added to achieve a refined regulation.

The valve device 12 may comprise separate valves in the inlet air channel 3 and in the recirculation conduit 10, said valves then being separately controllable by the EGR control device 13. Alternatively the valve device 12 may also comprise a unit, in which flows from the inlet air channel 3 and the recirculation conduit 10 may be selectively brought together, by means of valves contained in the valve device, to a common output flow, which is conveyed further to the turbo charger for super charging and introduction into the engine via the intercooler 5. A particularly suitable valve device 12 in one unit is a particular part of the invention and will be described more closely hereunder.

Figure 2A:
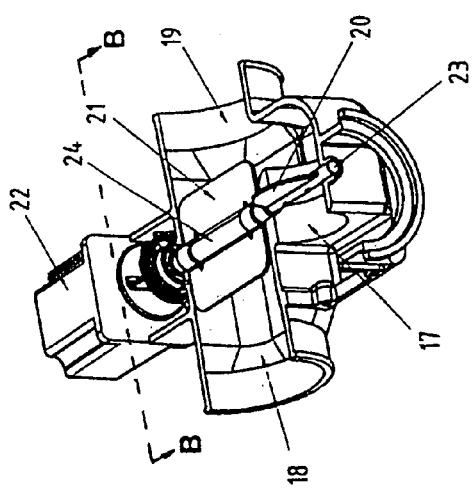
FIG. 2a illustrates a sectioned valve according to the invention in one end position.
Figure 2B:
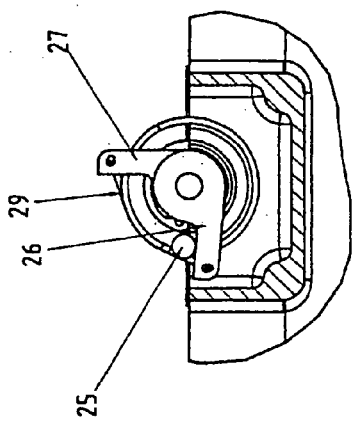
FIG. 2b is a section view of the valve in FIG. 2a as viewed in the direction of the arrow B—B.
Figure 3A:
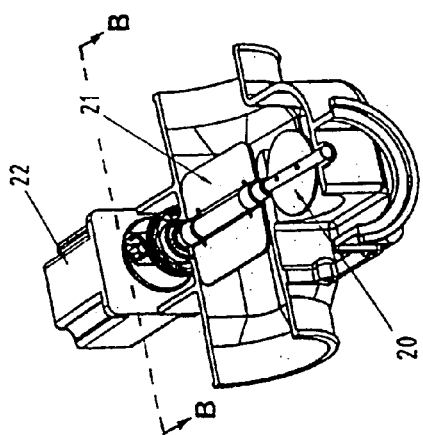
FIG. 3a illustrates a sectioned valve according to the invention in an intermediate position.
Figure 3B:
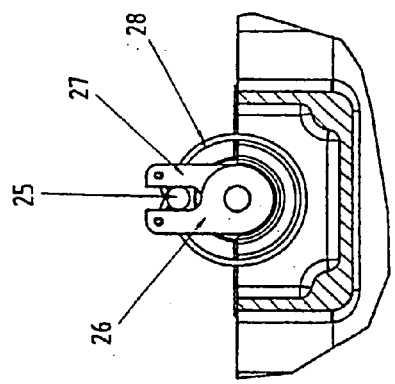
FIG. 3b illustrates a section view of the valve in FIG. 3a as viewed in the direction of the arrow B—B.
Figure 4A:
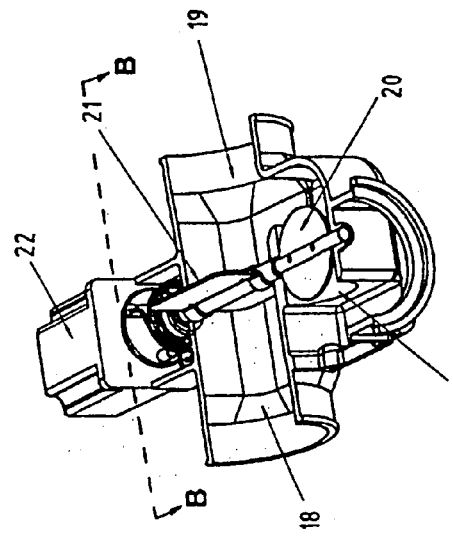
FIG. 4a illustrates a cut valve according to the invention in a second end position.
Figure 4B:
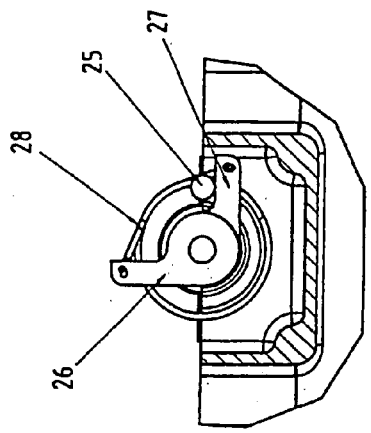
FIG. 4b illustrates a section view of the valve in FIG. 4a as viewed in the direction of the arrow B—B.

The valve illustrated in FIGS. 2–4 is a type of mixing valve providing for mixing of two in-flowing fluids in such a manner that the in-flowing fluid in one of the two inlet channels may be regulated from 0 to maximum, and thereafter the in-flowing fluid in the second inlet channel from a maximum to 0.

In use of the valve according to the invention as illustrated in FIGS. 2–4 as a valve device 12 in the method or device according to the invention, the inlet air channel 3 is connected to the second inlet channel 18 of the valve, whereas the recirculation conduit 10 is connected to the first inlet channel 17 of the valve. Furthermore, there is in the valve an outlet channel 19, which in the present embodiment conveys the gases mixed in the valve to the turbo charger 4. In both inlet channels 17 and 18, there are dampers 20 and 21, which are pivotable between an open and a closed position by means of an adjustment motor 22, for instance a step motor, to open or close the inlet channels. The two dampers 20, 21 are placed on concentric axles 23, 24, which are rotatable by means of the adjustment motor 22 and an actuation pin 25 driven by the motor, said actuation pin being capable of pivoting actuation arms 26, 27 connected to the axles 23 and 24 respectively. The actuation arms 26, 27 are spring loaded by one or more springs 28, 29 to a normal position, illustrated in FIG. 3, where both dampers 20, 21 are held in a position such that the inlet channels 17, 18 are open.

In the position illustrated in FIGS. 2a, b, which is a starting position, the adjustment motor 22 has, by means of its actuation pin 25 and by means of the actuation arm 26, rotated the damper 20 to a closed position, and thus, the first inlet channel 17 connected to the recirculation conduit 10 is closed and no exhaust gases may be recirculated to the turbo charger and the engine. The second actuation arm 27 is maintained in its normal position by the spring 29, which means that the damper 21 in the second inlet channel 18 connected to the inlet air channel 3 is maintained in its normally opened position and allows free flow of inlet air through the valve via the outlet channel 19 to the turbo charger. The adjustment motor 22 is controlled by the EGR control device 13 to regulate the relation between fresh air via the inlet air channel 3 and recirculated exhaust gases via the recirculation conduit 10. In the position with the damper 21 open, the adjustment motor 22 may rotate, by means of its actuation pin 25 and by means of the actuation arm 26, the damper 20 from the entirely closed position shown in FIGS. 2a, b to the position which is shown in FIGS. 3a, b where also the damper 20 is in such a position that also the first inlet channel 17 is open. The adjustment motor may also adjust the damper 20 into any position between these two end positions.

The position illustrated in FIGS. 3a, b, which is the normal position for the adjustment motor 20, is such that the actuation pin 25 of the adjustment motor does not actuate any of the actuation arms 26, 27 but they are maintained by the springs 28, 29 in a normal position, where, accordingly, the dampers 20, 21 open both inlet channels 17, 18.

FIGS. 4a, b illustrates a position contrary to the one in FIGS. 2a, b. Thus, the adjustment motor 22 has by means of its actuation pin 25 and by means of the actuation arm 27 rotated the damper 21 to a closed position, which means that the connection of the inlet air channel 3 with the outlet channel 19 is entirely interrupted whereas on the contrary the first inlet channel 17 connected to the recirculation conduit 10 is entirely open and allows the recirculated exhaust gases to freely flow further through the outlet channel 19 and then to the turbo charger 4 and further on to the engine. However, by means of the adjustment motor 22, the damper 21 may be adjusted into any intermediate position between the end positions illustrated in FIGS. 3 and 4 to allow a desired amount, controlled by the EGR control device 13, of fresh air to be mixed with the recirculated exhaust gases.

Thus, with the valve according to the invention it becomes possible to control, in a simple manner, a three-way valve having two inlets and having a normal position, where both inlets are open so that one or the other of the inlets may be controlled steplessly whereas the remaining inlet is maintained open. The valve may of course be controlled in other manners than by means of the EGR control device 13 described above and it may be used in quite different connections than the one now described and where corresponding control properties are desirable.

In a regulation method according to the invention, a control device is used which is supplied with information from a lambda probe 14, a motor speed sensor 15 and an engine load sensor 16. The control device is connected to a valve device, corresponding to the valve device 12 described here-inabove, for regulation of the in-flowing amounts of air and/or recirculated exhaust gases to the engine. This valve device is arranged between the air filter and the inlet channel of the engine and may, as also has been described for the valve device 12, comprise separate valves in the inlet air channel and recirculation conduit, or a three-way valve of the kind also described hereinabove. The valve device is controllable in a corresponding manner as also described hereinabove, and the control device may therefore control, based on the input signals received, the air/fuel relation of the engine by regulating the amount of in-flowing air and simultaneously regulating the relation between the supplied fresh air and recirculated exhaust gases. This aspect of the invention is applicable with or without supercharging.

With the regulation method and device according to the invention it is possible to further decrease the NOx-contents in the exhaust gases exiting from the end pipe of a diesel engine.

What is claimed is:

1. A device for recirculating a part of the exhaust gases from an exhaust pipe (6,9) of a diesel engine (1) to an inlet of the engine,
    a recirculation conduit (10) being provided for diverting the exhaust gases from the exhaust pipe (6,9) and directing them to a controllable valve device (12) arranged between the engine and an air intake (2) thereof for enabling supply of air/recirculated gases in a desired relation to a combustion chamber of the engine (1),
    the valve device comprising dampers (20,21) arranged in inlet channels (17, 18) for the recirculated exhaust gases and air respectively, characterized in that
    the valve device is arranged to always maintain at least one of the dampers open,
    a drive motor (22) common to the dampers is arranged to close the other of the dampers (20, 21), and
    both dampers (20, 21) in a normal position are spring loaded (28, 29) to an open position.

2. A device according to claim 1, characterized in that the drive motor (22) of the valve device (12) is controlled by a control device (13) regulating, by the positions of the dampers (20,21), the relation air/recirculated exhaust gases in the valve device (12) based on information (14, 15, 16) supplied as to the actual operational state of the engine.

3. A device according to claim 1, characterized in that the recirculation conduit (10) is connected to the exhaust pipe (6,9) of the engine after the catalyst (7) and a particle filter (8).

4. A device according to claim 1, characterized by a cooler (11) arranged in the recirculation conduit (10) to cool the recirculated exhaust gases.

5. A device according to claim 1, characterized in that in a diesel engine having a super charger, the valve (12) is arranged between the air intake (2) and the super charger.

6. A device according to claim 1, characterized in that the drive motor is a step-motor (22) arranged to operate one of the dampers (20,21) at a time and adjust the same into an arbitrary position.

7. A device for recirculating a part of the exhaust gases from an exhaust pipe (6,9) of a diesel engine (1) to an inlet of the engine,
    a recirculation conduit (10) being provided for diverting the exhaust gases from the exhaust pipe (6,9) and directing them to a controllable valve device (12) arranged between the engine and an air intake (2) thereof for enabling supply of air/recirculated gases in a desired relation to a combustion chamber of the engine (1),
    the valve device comprising dampers (20,21) arranged in inlet channels (17, 18) for the recirculated exhaust gases and air respectively, characterized in that
    the valve device is arranged to always maintain at least one of the dampers open,
    a drive motor (22) common to the dampers is arranged to close the other of the dampers (20, 21),
    the valve device (12) comprises a first axle (23) on which a first one (20) of the dampers is arranged and a second axle (24) on which a second one (21) of the dampers is arranged,
    the first and second axles (23, 24) being concentric, and
    both axles (23, 24) are arranged to be rotatable by the drive motor (22).

8. A device according to claim 7, characterized in that the first axle (23) is connected to a first actuation arm (26),
    the second axle (24) is connected to a second actuation arm (27), and
    the valve device (12) comprises an actuation pin (25) which is movablee by the drive motor (22) in order to rotate the first axle (23) and the second axle (24) by interaction with the first actuation arm (26) and the second actuation arm (27), respectively, to control the position of the dampers (20, 21).

9. A device according to claim 8, characterized in that the valve device (12) comprises springs (28, 29) acting on the actuation arms (26, 27) to spring load each damper (20, 21) towards an open position.

10. A device according to claim 7, characterized in that the drive motor (22) of the valve device (12) is controlled by a control device (13) regulating, by the positions of the dampers (20,21), the relation air/recirculated exhaust gases in the valve device (12) based on information (14, 15, 16) supplied to the actual operational state of the engine.

11. A device according to claim 7, characterized in that the recirculation conduit (10) is connected to the exhaust pipe (6,9) of the engine after the catalyst (7) and a particle filter (8).

12. A device according to claim 7, characterized by a cooler (11) arranged in the recirculation conduit (10) to cool the recirculated exhaust gases.

13. A device according to claim 7, characterized in that in a diesel engine having a super charger, the valve (12) is arranged between the air intake (2) and the super charger.

14. A device according to claim 7, characterized in that the drive motor is a step-motor (22) arranged to operate one of the dampers (20,21) at a time and adjust the same into an arbitrary position.

15. A valve for mixing two fluids flowing through two inlet channels (17, 15), characterized in that
    dampers (20, 21) are arranged in both inlet channels (17, 18),
    at least one of the dampers always is open and a common motor (22) is arranged to close the other of said dampers (20, 21),
    the motor is a step-motor (22) arranged to operate one of the dampers (20, 21) at a time and adjust the same into an arbitrary position, and
    both dampers (20, 21) in a normal position are spring loaded (28,29) to an open position.

16. A valve according to claim 15, characterized in that the valve (12) comprises a first axle (23) on which a first one (20) of the dampers is arranged and a second axle (24) on which a second one (21) of the dampers is arranged,
    the first and second axles (23, 24) being concentric, and
    both axles (23, 24) are arranged to be rotatable by the motor (22).

17. A valve for mixing two fluids flowing through two inlet channels (17, 18), characterized in that
    dampers (20, 21) are arranged in both inlet channels (17, 18),
    at least one of the dampers always is open and a common motor (22) is arranged to close the other of said dampers (20, 21),
    the motor is a step-motor (22) arranged to operate one of the dampers (20, 21) at a time and adjust the same into an arbitrary position,
    the valve (12) comprises a first axle (23) on which a first one (20) of the dampers is arranged and a second axle

(24) on which a second one (21) of the dampers is arranged, the first and second axles (23, 24) being concentric, both axles (23,24) are arranged to be rotatable by the motor (22), the first axle (23) is connected to a first actuation arm (26), the second axle (24) is connected to a second actuation arm (27), and the valve (12) comprises an actuation pin (25) which is moveable by the motor (22) to rotate the first axle (23) and the second axle (24) by interaction with the first actuation arm (26) and the second actuation arm (27), respectively, to control the position of the dampers (20, 21).

18. A valve according to claim 17, characterized in that the valve (12) comprises springs (28, 29) acting in the actuation arms (26, 27) to spring load each damper (20, 21) towards an open position.

\* \* \* \* \*